(12) United States Patent
Collins et al.

(10) Patent No.: US 9,104,991 B2
(45) Date of Patent: Aug. 11, 2015

(54) PREDICTIVE RETIREMENT TOOLSET

(75) Inventors: Erin Kristin Collins, Norfolk, VA (US);
Marianna E. Chandler, McDonough, GA (US); Patty M. Curtner, Broken Arrow, OK (US); Sherrill Jean Massingham, Benicia, CA (US); Joni DeVoe McKeen, Hanover, VA (US); Darryl Alan Sansbury, Charlotte, NC (US); Siroos Shahnizadeh, Charlotte, NC (US); Anthony Simoes, Charlotte, NC (US); Rajaraman Viswanathan, Allen, TX (US)

(73) Assignee: Bank of America Corporation, Charlotte, NC (US)

( * ) Notice: Subject to any disclaimer, the term of this patent is extended or adjusted under 35 U.S.C. 154(b) by 757 days.

(21) Appl. No.: 12/847,364

(22) Filed: Jul. 30, 2010

(65) Prior Publication Data
US 2012/0030645 A1    Feb. 2, 2012

(51) Int. Cl.
*G06F 9/44* (2006.01)
*G06Q 10/06* (2012.01)

(52) U.S. Cl.
CPC *G06Q 10/06* (2013.01); *G06F 8/70* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 5,826,055 A * | 10/1998 | Wang et al. | | 712/218 |
| 6,247,121 B1 * | 6/2001 | Akkary et al. | | 712/239 |
| 6,412,064 B1 * | 6/2002 | Wang et al. | | 712/218 |
| 6,530,084 B1 * | 3/2003 | Del Sesto et al. | | 725/61 |
| 6,615,340 B1 * | 9/2003 | Wilmot, II | | 712/209 |
| 6,922,827 B2 * | 7/2005 | Vasilik et al. | | 717/140 |
| 7,003,560 B1 * | 2/2006 | Mullen et al. | | 709/223 |
| 7,069,571 B1 * | 6/2006 | Del Sesto et al. | | 725/14 |
| 7,197,466 B1 * | 3/2007 | Peterson et al. | | 705/59 |
| 7,590,599 B2 * | 9/2009 | Xia et al. | | 705/51 |
| 7,694,308 B1 * | 4/2010 | Dickson et al. | | 719/312 |
| 7,788,641 B2 * | 8/2010 | Tarr et al. | | 717/125 |

(Continued)

OTHER PUBLICATIONS

A. Ananda Rao et al., "Software Design Versioning using Propagation Probability Matrix", Indian Institute of Technology, Madras, India, 2005, <http://dos.iitm.ac.in/LabPapers/softwareDesign.pdf> pp. 1-6.*

(Continued)

*Primary Examiner* — Thuy Dao
*Assistant Examiner* — Samuel Hayim
(74) *Attorney, Agent, or Firm* — Michael A. Springs; Moore & Van Allen PLLC; Patrick B. Horne

(57) ABSTRACT

A system assesses one or more applications for retirement. The system includes a processing device configured for receiving attribute data corresponding to one or more of a plurality of applications. The processing device is further configured for determining one or more of the plurality of applications to assess for retirement, translating at least some of the received attribute data into two or more translated values based at least in part on one or more predetermined values, and summing two or more of the translated values, thereby resulting in one or more combined values. The processing device is further configured for calculating one or more cumulative values based at least in part on the one or more combined values and converting the one or more cumulative values, thereby resulting in one or more probability values each indicating the probability of retirement of one of the one or more applications.

15 Claims, 8 Drawing Sheets

(56) References Cited

U.S. PATENT DOCUMENTS

| | | | |
|---|---|---|---|
| 7,818,410 B1* | 10/2010 | Barnes et al. | 709/223 |
| 7,895,628 B2* | 2/2011 | Estipona | 725/58 |
| 7,917,921 B2* | 3/2011 | Houldsworth | 725/25 |
| 7,970,729 B2* | 6/2011 | Cozzi | 707/601 |
| 2002/0059512 A1* | 5/2002 | Desjardins | 713/1 |
| 2003/0033191 A1* | 2/2003 | Davies et al. | 705/10 |
| 2003/0056192 A1* | 3/2003 | Burgess | 717/100 |
| 2003/0070157 A1* | 4/2003 | Adams et al. | 717/101 |
| 2003/0093575 A1* | 5/2003 | Upton | 709/310 |
| 2003/0105884 A1* | 6/2003 | Upton | 709/318 |
| 2003/0110315 A1* | 6/2003 | Upton | 709/328 |
| 2003/0163799 A1* | 8/2003 | Vasilik et al. | 717/100 |
| 2004/0073886 A1* | 4/2004 | Irani | 717/101 |
| 2004/0128645 A1* | 7/2004 | Srivastava | 717/101 |
| 2004/0138950 A1* | 7/2004 | Hyman et al. | 705/14 |
| 2005/0210441 A1* | 9/2005 | Tarr et al. | 717/101 |
| 2005/0262494 A1* | 11/2005 | Fung et al. | 717/170 |
| 2005/0278318 A1* | 12/2005 | Vasilik et al. | 707/3 |
| 2006/0080327 A1* | 4/2006 | Gramling et al. | 707/100 |
| 2006/0101443 A1* | 5/2006 | Nasr | 717/163 |
| 2006/0106825 A1* | 5/2006 | Cozzi | 707/100 |
| 2007/0079294 A1* | 4/2007 | Knight et al. | 717/130 |
| 2007/0124724 A1* | 5/2007 | Irani | 717/106 |
| 2007/0219933 A1* | 9/2007 | Datig | 706/4 |
| 2007/0240143 A1* | 10/2007 | Guminy et al. | 717/168 |
| 2008/0126327 A1* | 5/2008 | Dettinger et al. | 707/4 |
| 2008/0127089 A1* | 5/2008 | Peretz et al. | 717/122 |
| 2009/0193411 A1* | 7/2009 | Saxton et al. | 717/174 |
| 2010/0153908 A1* | 6/2010 | Sarkar et al. | 717/104 |
| 2010/0205112 A1* | 8/2010 | Reynolds et al. | 705/36 R |
| 2011/0246960 A1* | 10/2011 | Kleingon | 717/104 |

OTHER PUBLICATIONS

"Application Portfolio Management: From assessment to transformation", IBM, 2004, <https://www-935.ibm.com/services/uk/igs/pdf/esr-application-portfolio-management-from-assessment-to-transformation.pdf>, pp. 1-16.*

Yang et al., "Application Research of Disruptive Innovation in Product Lifecycle", IEEE, 2009, <http://ieeexplore.ieee.org/stamp/stamp.jsp?tp=&arnumber=5344495>, pp. 1-4.*

Diana Lau et al., "Lifecycle of Composite Business Applications enabled by WebSphere Business Process Management", IBM, 2008, <http://delivery.acm.org/10.1145/1730000/1723089/p331-lau.pdf>, p. 1.*

* cited by examiner

PREDICTIVE RETIREMENT TOOLSET

FIELD

In general, embodiments of the invention relate to assessing applications for retirement. More specifically, embodiments of the invention relate to systems for producing a probability value indicating the probability of retirement of the application

BACKGROUND

Today, applications, for example, software applications, in use by an organization, are often targeted for retirement when a project is executed to enhance or consolidate duplicate functions provided to the organization by multiple applications. Such projects are usually initiated by a line or business within the organization on a reactive or "as-needed" basis. In some cases, projects targeting one or more applications for retirement are focused on initiating a new product and it is determined during the project, as an ancillary issue, that one or more applications may be ready for retirement. In most cases, after the initial identification of applications potentially facing retirement, multiple entities, including both people as well as computing resources, are involved in the final determination regarding retirement of applications. However, such a determination is generally unorganized and can be somewhat haphazard. Hence, methods and systems for improving consistency in determining applications ready for retirement including effective and consistent decision criteria are needed.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description presented later.

Embodiments of the present invention address the above needs and/or achieve other advantages by providing methods, systems and computer program products comprising instructions for assessing one or more applications for retirement.

According to embodiments of the present invention, a method for assessing an application for retirement includes receiving, at a processing device, attribute data corresponding to the application. The method also includes translating, by the processing device, at least some of the received attribute data into one or more translated values based at least in part on one or more predetermined values and conditioning, by the processing device, the one or more translated values, thereby producing a probability value indicating the probability of retirement of the application.

In some embodiments of the method, the one or more translated values comprise two or more translated values, and the method also includes combining, by the processing device, the two or more translated values, thereby resulting in a combined value. In such embodiments, conditioning the one or more translated values includes conditioning, by the processing device, the combined value. In some such embodiments, combining the two or more translated values includes summing, by the processing device, the two or more translated values, thereby resulting in the combined value. In other such embodiments, conditioning the combined value includes calculating, by the processing device, a cumulative value based at least in part on the combined value. In some such embodiments, conditioning the combined value includes converting, by the processing device, the cumulative value, thereby resulting in the probability value.

In some embodiments, the method also includes receiving, at the processing device, attribute data corresponding to one or more of a plurality of applications, and determining, by the processing device, one or more of the plurality of applications to assess for retirement. The method also includes conditioning the one or more translated values thereby produces one or more probability values each indicating the probability of retirement of the one or more applications. In some such embodiments, determining one or more of the plurality of applications to assess for retirement includes filtering the attribute data corresponding to the plurality of applications based at least in part on which of the plurality of applications with which the attribute data corresponds. In some such embodiments, each of the plurality of applications are classified into one or more of a plurality of classifications, and the filtering is based at least in part on which of the one or more of the plurality of classifications each of the plurality of applications is classified. In some such embodiments, each of the plurality of classifications corresponds with one or more lines of business within an organization.

In some embodiments, the filtering is based at least in part on which of a plurality of statements of work each of the plurality of applications is listed.

In other embodiments, the attribute data includes data corresponding to one or more attributes, the attribute data includes one or more attribute values each associated with the application, and the one or more predetermined values include one or more first predetermined values. The method also includes constructing, by the processing device, a lookup table associated with one or more attributes, the lookup table comprising one or more lookup fields each associated with one or more of the first predetermined values. In such embodiments, translating at least some of the received attribute data includes comparing the one or more lookup fields with each of the one or more attribute values to choose one or more of the first predetermined values, the one or more translated values based at least in part on the chosen one or more first predetermined values. In some such embodiments, the one or more predetermined values further comprise one or more second predetermined values, and the method also includes constructing, by the processing device, a probability table associated with one or more attributes, the probability table comprising one or more probability fields each associated with one or more of the second predetermined values, and translating at least some of the received attribute data further includes comparing the chosen one or more first predetermined values with each of the one or more probability fields to choose one or more of the second predetermined values, the one or more translated values based at least in part on the chosen one or more second predetermined values.

According to other embodiments of the present invention, a system for assessing an application for retirement includes a processing device configured for receiving attribute data corresponding to the application, translating at least some of the received attribute data into one or more translated values based at least in part on one or more predetermined values, and conditioning the one or more translated values, thereby producing a probability value indicating the probability of retirement of the application.

In some embodiments of the system, the one or more translated values include two or more translated values, and the processing device further configured for combining the two or more translated values, thereby resulting in a combined value; and conditioning the combined value. In some such embodiments, the processing device is further configured for summing the two or more translated values, thereby resulting in the combined value. In other such embodiments, the processing device is further configured for calculating a cumulative value based at least in part on the combined value. In some such embodiments, the processing device is further configured for converting the cumulative value, thereby resulting in the probability value.

In some embodiments, the processing device is further configured for receiving attribute data corresponding to one or more of a plurality of applications, determining one or more of the plurality of applications to assess for retirement, and conditioning the one or more translated values thereby producing one or more probability values each indicating the probability of retirement of the one or more applications. In some such embodiments, the processing device is further configured for filtering the attribute data corresponding to the plurality of applications based at least in part on which of the plurality of applications with which the attribute data corresponds. In some such embodiments, each of the plurality of applications are classified into one or more of a plurality of classifications, and the filtering is based at least in part on which of the one or more of the plurality of classifications each of the plurality of applications is classified. In some such embodiments, each of the plurality of classifications corresponds with one or more lines of business within an organization. In other such embodiments, the filtering is based at least in part on which of a plurality of statements of work each of the plurality of applications is listed.

In some embodiments, the attribute data comprises data corresponding to one or more attributes, the attribute data comprises one or more attribute values each associated with the application, and the one or more predetermined values comprise one or more first predetermined values. In such embodiments, the processing device is further configured for constructing a lookup table associated with one or more attributes, the lookup table comprising one or more lookup fields each associated with one or more of the first predetermined values and comparing the one or more lookup fields with each of the one or more attribute values to choose one or more of the first predetermined values, the one or more translated values based at least in part on the chosen one or more first predetermined values. In some such embodiments, the one or more predetermined values further comprise one or more second predetermined values, and the processing device is further configured for constructing a probability table associated with one or more attributes, the probability table comprising one or more probability fields each associated with one or more of the second predetermined values and comparing the chosen one or more first predetermined values with each of the one or more probability fields to choose one or more of the second predetermined values, the one or more translated values based at least in part on the chosen one or more second predetermined values.

According to other embodiments of the present invention, a computer program product includes a non-transitory computer-readable memory including computer executable instructions for assessing an application for retirement. The instructions include instructions for receiving attribute data corresponding to the application, instructions for translating at least some of the received attribute data into one or more translated values based at least in part on one or more predetermined values, and instructions for conditioning the one or more translated values, thereby producing a probability value indicating the probability of retirement of the application.

In some such embodiments, the one or more translated values include two or more translated values, and the instructions further include instructions for combining the two or more translated values, thereby resulting in a combined value, and the instructions for conditioning the one or more translated values include instructions for conditioning the combined value. In some such embodiments, the instructions for combining the two or more translated values include instructions for summing the two or more translated values, thereby resulting in the combined value.

In some embodiments, the instructions for conditioning the combined value include instructions for calculating a cumulative value based at least in part on the combined value. In some such embodiments, the instructions for conditioning the combined value include instructions for converting the cumulative value, thereby resulting in the probability value.

In some embodiments, the instructions also include instructions for receiving attribute data corresponding to one or more of a plurality of applications and instructions for determining one or more of the plurality of applications to assess for retirement. In such embodiments, the instructions for conditioning the one or more translated values thereby produces one or more probability values each indicating the probability of retirement of the one or more applications. In some such embodiments, the instructions for determining one or more of the plurality of applications to assess for retirement include instructions for filtering the attribute data corresponding to the plurality of applications based at least in part on which of the plurality of applications with which the attribute data corresponds. In some such embodiments, each of the plurality of applications are classified into a one or more of a plurality of classifications, and the instructions for filtering are based at least in part on which of the one or more of the plurality of classifications each of the plurality of applications is classified. In some such embodiments, each of the plurality of classifications corresponds with one or more lines of business within an organization.

In some embodiments, the instructions for filtering are based at least in part on which of a plurality of statements of work each of the plurality of applications is listed.

In some embodiments, the attribute data comprises data corresponding to one or more attributes, the attribute data comprises one or more attribute values each associated with the application, and the one or more predetermined values comprise one or more first predetermined values. In such embodiments, the instructions include instructions for constructing a lookup table associated with one or more attributes, and the lookup table includes one or more lookup fields each associated with one or more of the first predetermined values. In such embodiments, the instructions for translating at least some of the received attribute data include instructions for comparing the one or more lookup fields with each of the one or more attribute values to choose one or more of the first predetermined values, the one or more translated values based at least in part on the chosen one or more first predetermined values. In some such embodiments, the one or more predetermined values further include one or more second predetermined values, the instructions also include instructions for constructing a probability table associated with one or more attributes, and the probability table includes one or more probability fields each associated with one or more of the second predetermined values. In such embodiments, the instructions for translating at least some of the received attribute data further include instructions for comparing the chosen one or more first predetermined values with each of the one or more probability fields to choose one or more of the second predetermined values, the one or more translated values based at least in part on the chosen one or more second predetermined values.

According to embodiments of the present invention, a method for assessing one or more applications for retirement includes receiving, at a processing device, attribute data corresponding to one or more of a plurality of applications, determining, by the processing device, one or more of the plurality of applications to assess for retirement, and translating, by the processing device, at least some of the received attribute data into two or more translated values based at least in part on one or more predetermined values. The method also includes summing, by the processing device, two or more of the translated values, thereby resulting in one or more combined values, calculating, by the processing device, one or more cumulative values based at least in part on the one or more combined values, and converting, by the processing device, the one or more cumulative values, thereby resulting in one or more probability values each indicating the probability of retirement of at least one of the one or more applications.

In some such embodiments, determining one or more of the plurality of applications to assess for retirement includes filtering the attribute data corresponding to the plurality of applications based at least in part on which of the plurality of applications with which the attribute data corresponds. In some such embodiments, each of the plurality of applications are classified into one or more of a plurality of classifications, and the filtering is based at least in part on which of the one or more of the plurality of classifications each of the plurality of applications is classified. In some such embodiments, wherein each of the plurality of classifications each corresponds with one or more lines of business within an organization.

In some embodiments, the filtering is based at least in part on which of a plurality of statements of work each of the plurality of applications is listed.

In some embodiments, the attribute data comprises data corresponding to one or more attributes, the attribute data comprises one or more attribute values each associated with one or more application, and the one or more predetermined values comprise one or more first predetermined values. In such embodiments, the method also includes constructing, by the processing device, one or more lookup tables associated with one or more attributes, the one or more lookup tables each comprising one or more lookup fields each associated with one or more of the first predetermined values. In such embodiments, translating at least some of the received attribute data includes comparing the one or more lookup fields with each of the one or more attribute values to choose one or more of the first predetermined values, the one or more translated values based at least in part on the chosen one or more first predetermined values.

In some such embodiments, the one or more predetermined values also include one or more second predetermined values. In such embodiments, the method also includes constructing, by the processing device, one or more probability tables associated with one or more attributes, the one or more probability tables comprising one or more probability fields each associated with one or more of the second predetermined values. In such embodiments, translating at least some of the received attribute data also includes comparing the chosen one or more first predetermined values with each of the one or more probability fields to choose one or more of the second predetermined values, the one or more translated values based at least in part on the chosen one or more second predetermined values.

According to other embodiments of the present invention, a system for assessing one or more applications for retirement includes a processing device configured for receiving attribute data corresponding to one or more of a plurality of applications, determining one or more of the plurality of applications to assess for retirement, and translating at least some of the received attribute data into two or more translated values based at least in part on one or more predetermined values. The processing device is also configured for summing two or more of the translated values, thereby resulting in one or more combined values, calculating one or more cumulative values based at least in part on the one or more combined values, and converting the one or more cumulative values, thereby resulting in one or more probability values each indicating the probability of retirement of at least one of the one or more applications.

According to other embodiments of the present invention, a computer program product includes a non-transient computer-readable memory including computer-readable instructions for assessing one or more applications for retirement. The instructions include instructions for receiving attribute data corresponding to one or more of a plurality of applications, instructions for determining one or more of the plurality of applications to assess for retirement, and instructions for translating at least some of the received attribute data into two or more translated values based at least in part on one or more predetermined values. The instructions also include instructions for summing two or more of the translated values, thereby resulting in one or more combined values, instructions for calculating one or more cumulative values based at least in part on the one or more combined values, and instructions for converting the one or more cumulative values, thereby resulting in one or more probability values each indicating the probability of retirement of at least one of the one or more applications.

The following description and the annexed drawings set forth in detail certain illustrative features of one or more embodiments of the invention. These features are indicative, however, of but a few of the various ways in which the principles of various embodiments may be employed, and this description is intended to include all such embodiments and their equivalents.

BRIEF DESCRIPTION OF THE DRAWINGS

Figure 1:
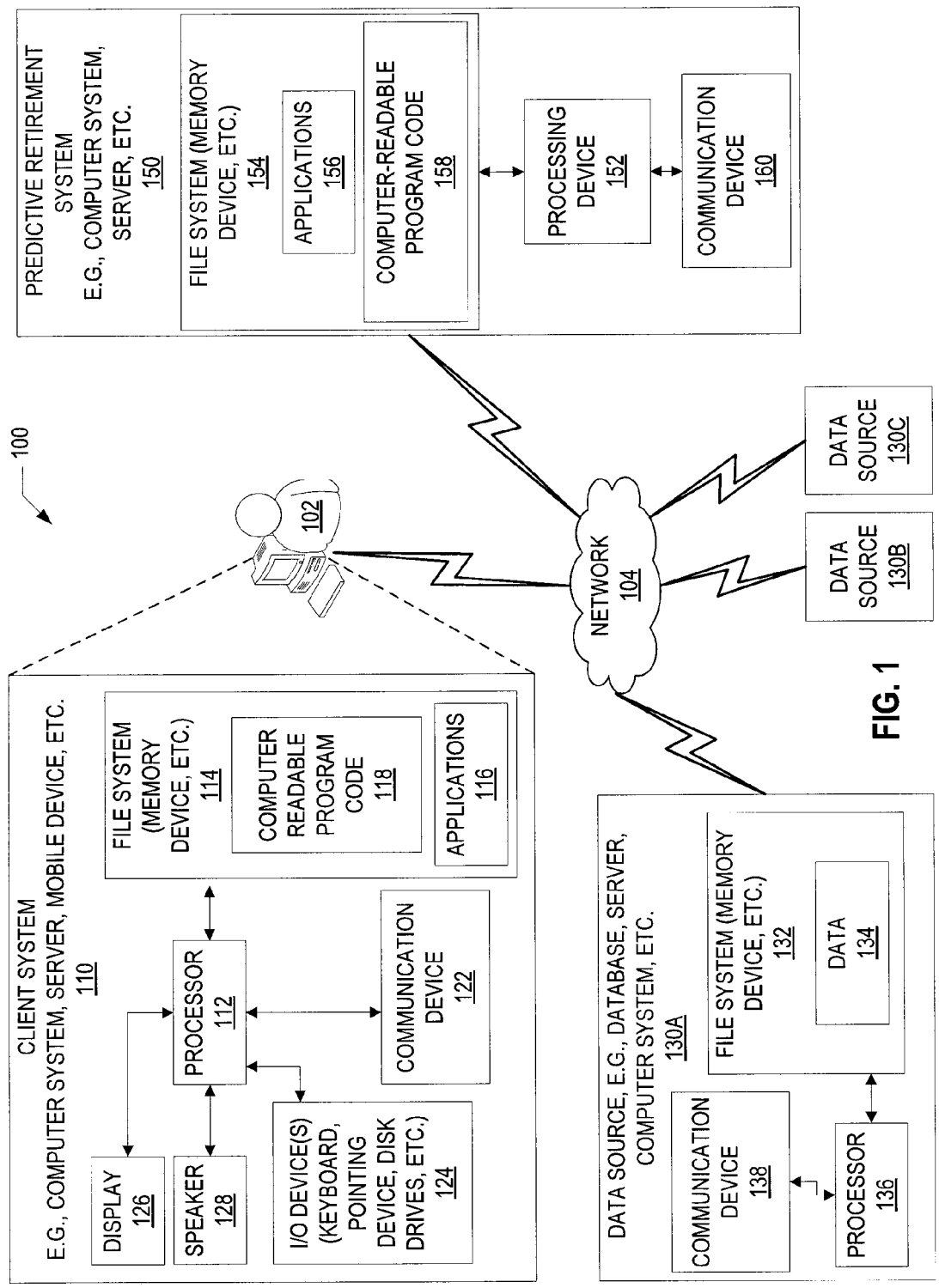
Figure 2:
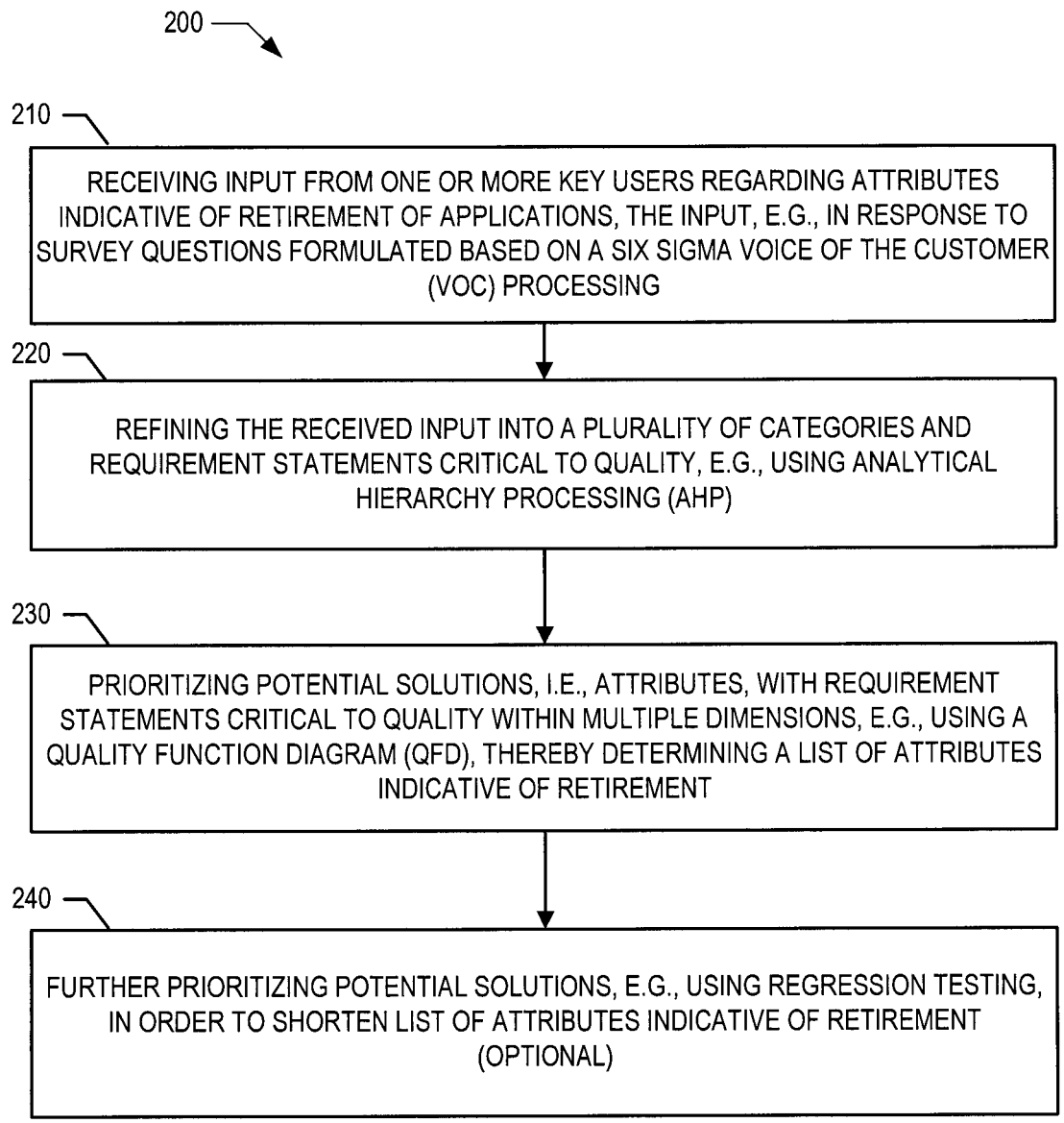
Figure 3:
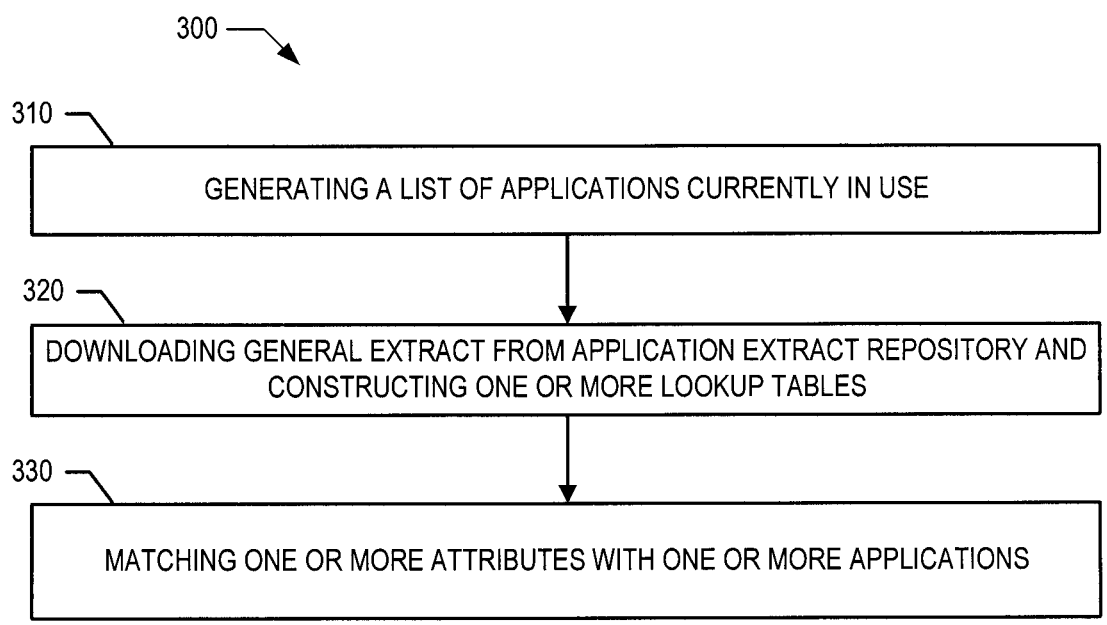
Figure 4:
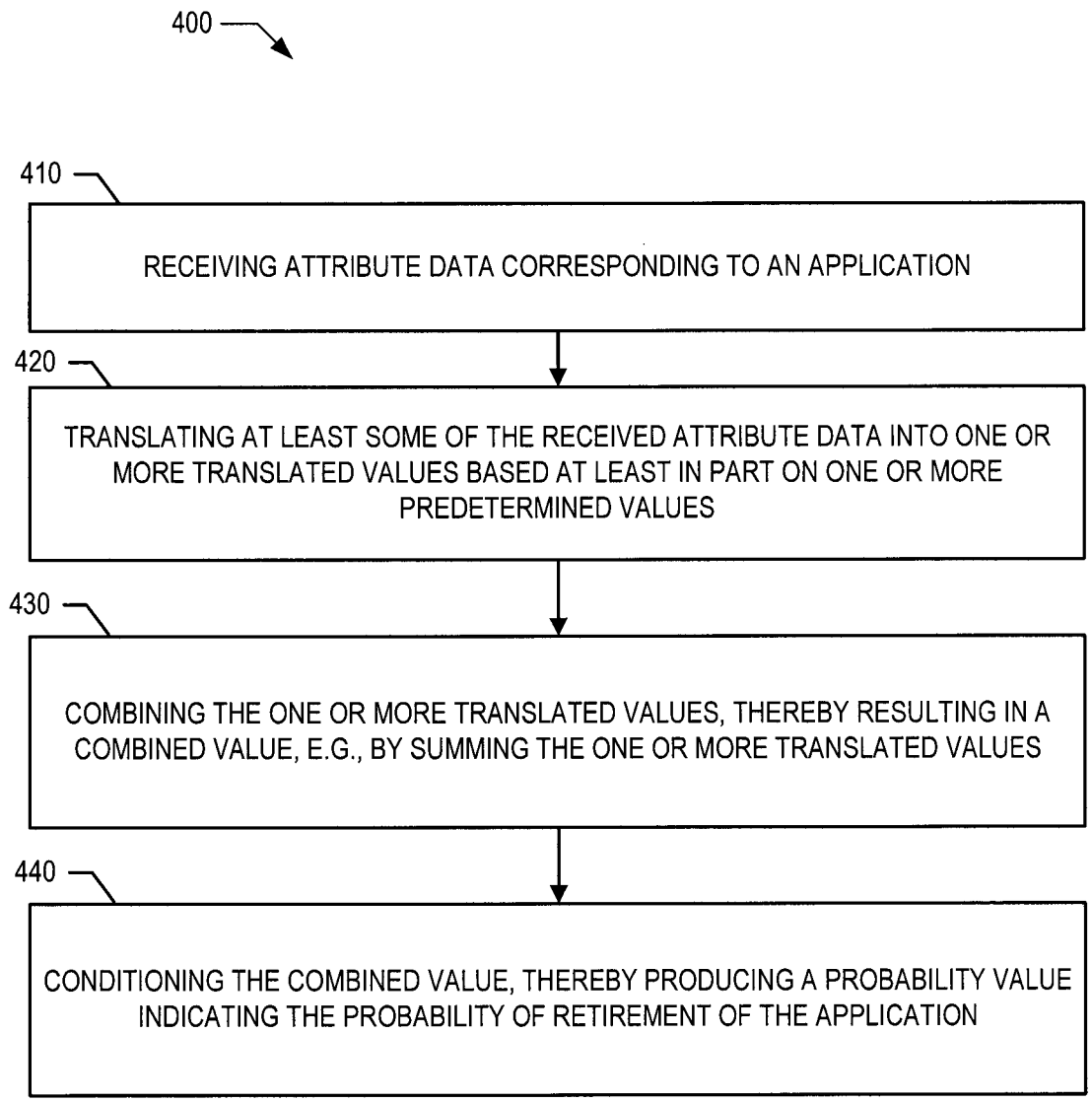
Figure 5:
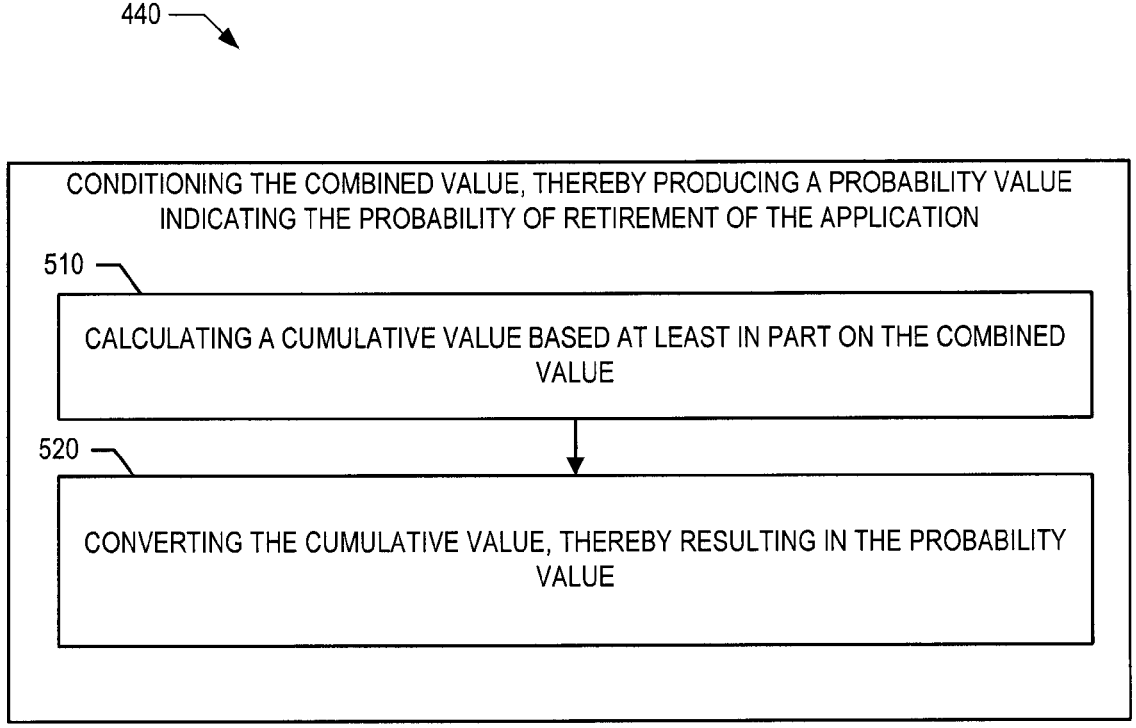
Figure 6:
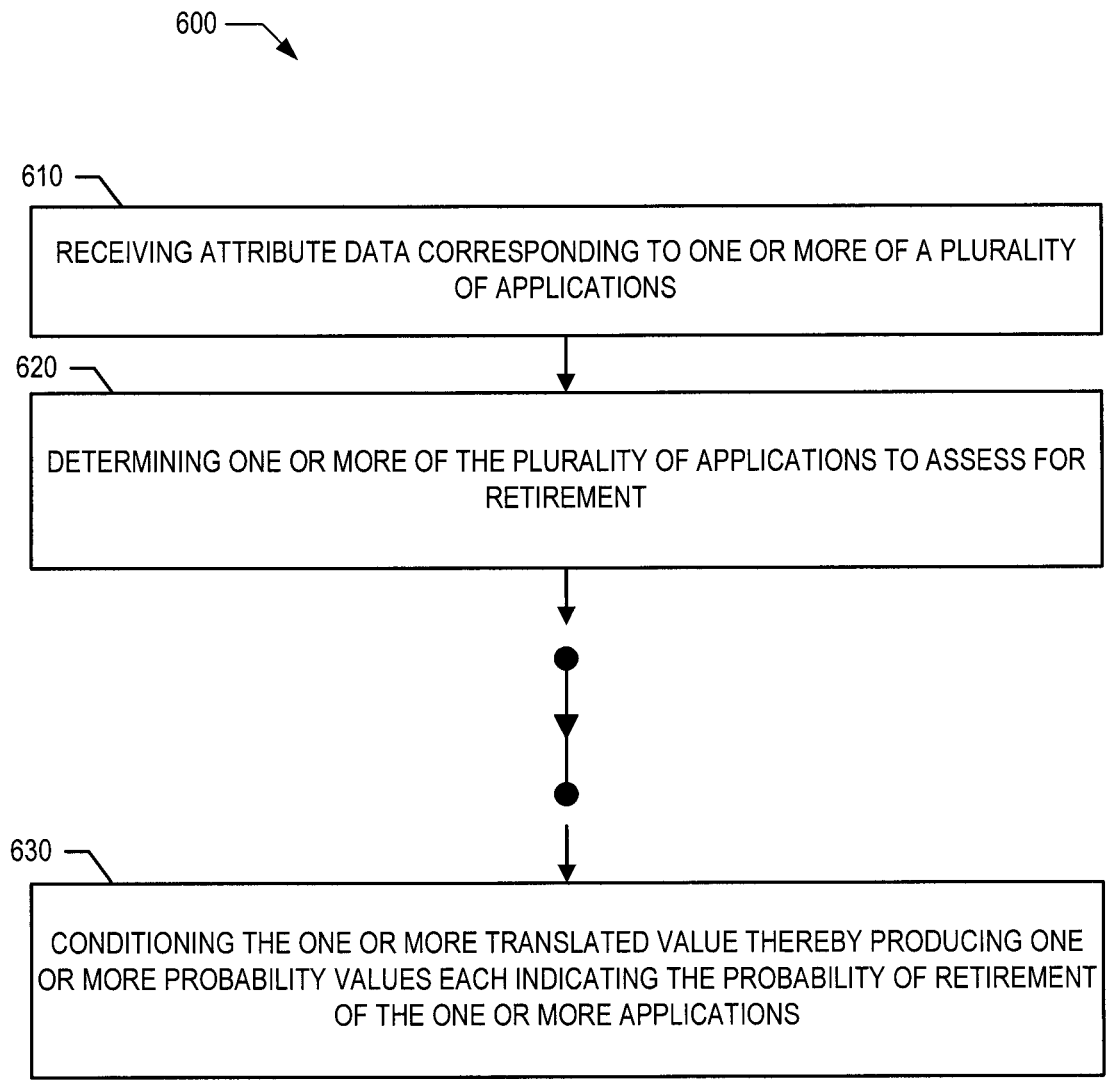
Figure 7:
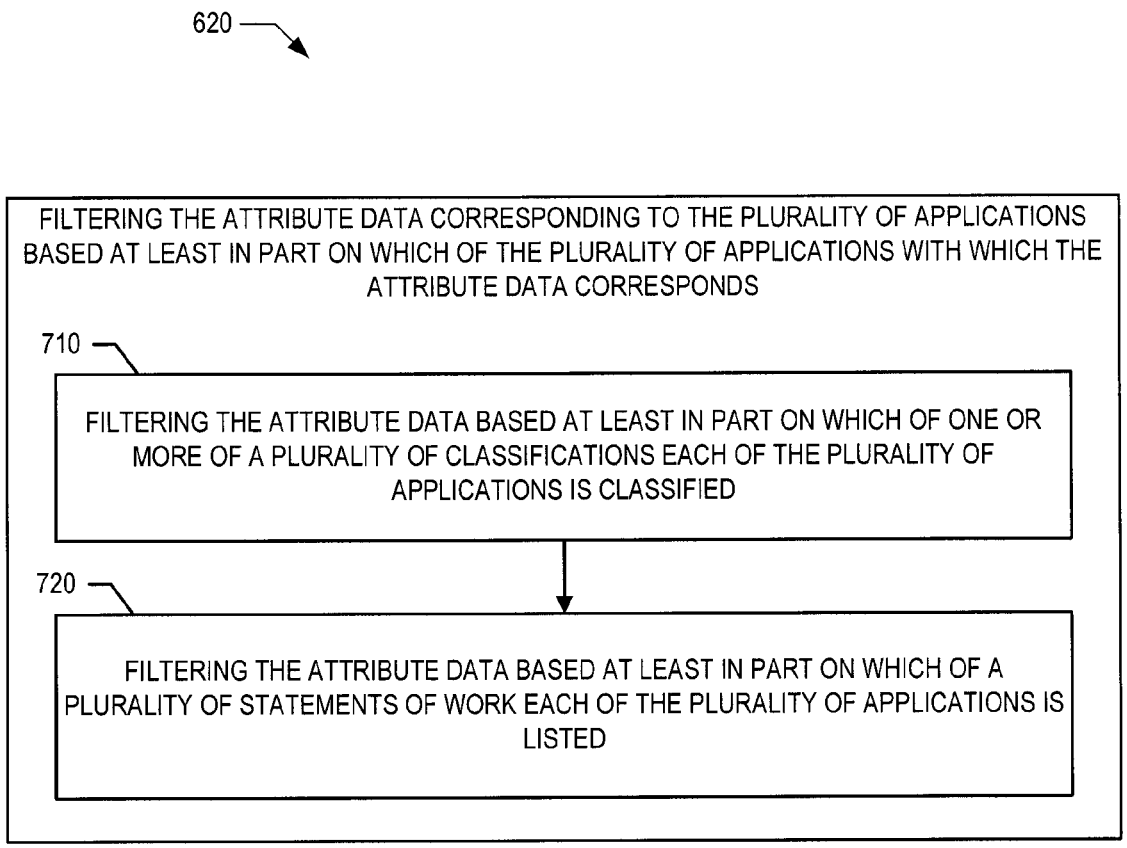
Figure 8:
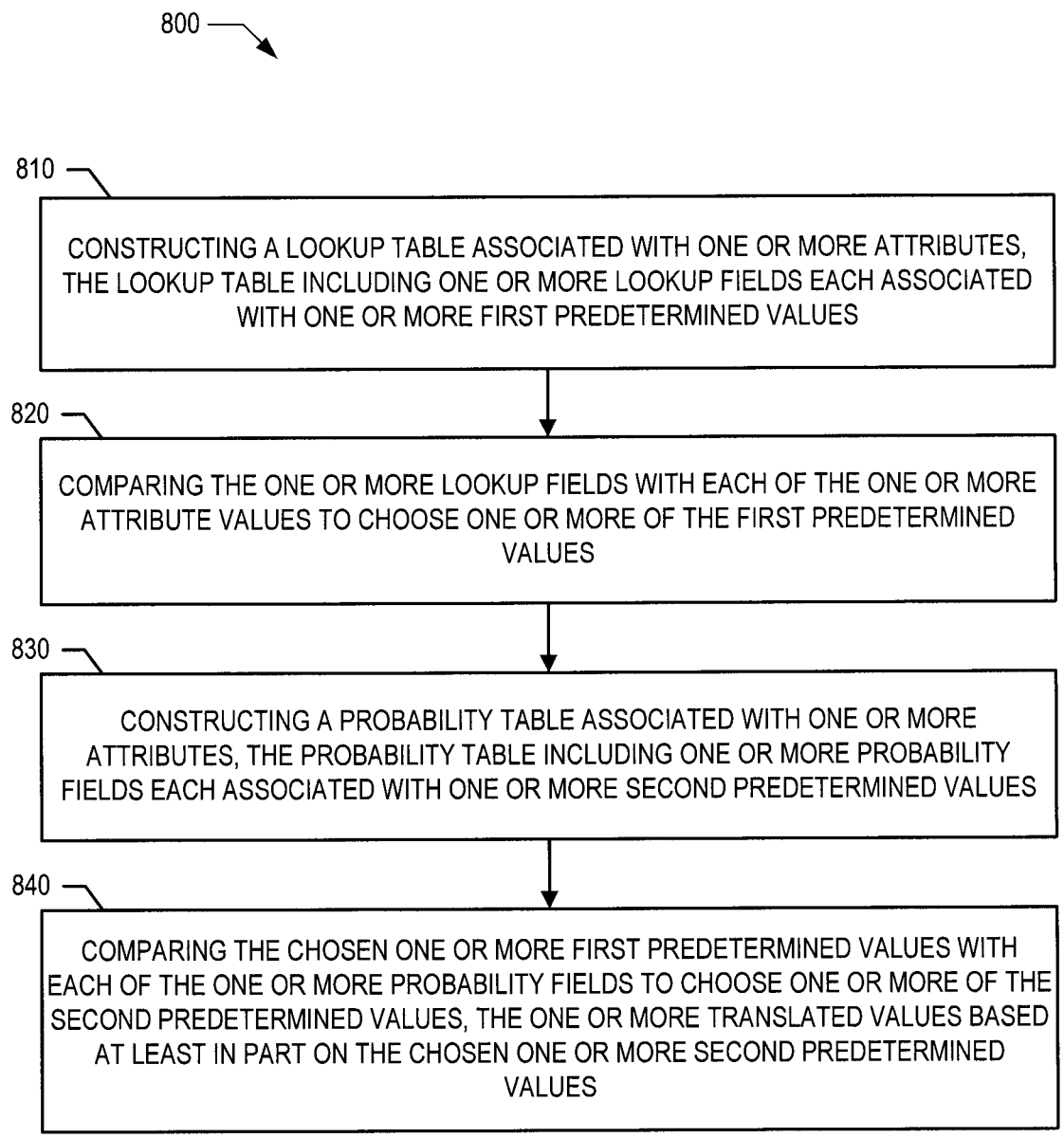

Having thus described embodiments of the invention in general terms, reference will now be made to the accompanying drawings, wherein:

FIG. 1 is a block diagram illustrating an environment 100 in which a predictive retirement system 150 for assessing retirement of an application operates according to embodiments of the present invention;

FIG. 2 is a flowchart illustrating a method 200 for selecting one or more attributes indicative of application retirement according to embodiments of the present invention;

FIG. 3 is a flowchart illustrating a method 300 for setting up the predictive retirement toolset according to embodiments of the present invention;

FIG. 4 is a flowchart illustrating a method 400 for assessing an application for retirement according to embodiments of the present invention;

FIG. 5 is a flowchart illustrating step 440, previously presented in FIG. 4, in greater detail according to embodiments of the present invention;

FIG. 6 is a flowchart illustrating a method 600 for assessing a plurality of applications for retirement according to embodiments of the present invention;

FIG. 7 is a flowchart illustrating step 620, originally presented in FIG. 6, in greater detail according to embodiments of the present invention; and FIG. 8 is a flowchart illustrating a method 800 for constructing one or more tables used in some embodiments of step 420 originally presented in FIG. 4 according to embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the invention provide for method, systems and computer program products comprising instructions for assessing one or more applications for retirement. One embodiment of the system includes a processing device configured for receiving attribute data corresponding to one or more of a plurality of applications. The processing device is further configured for determining one or more of the plurality of applications to assess for retirement, translating at least some of the received attribute data into two or more translated values based at least in part on one or more predetermined values, and summing two or more of the translated values, thereby resulting in one or more combined values. The processing device is further configured for calculating one or more cumulative values based at least in part on the one or more combined values and converting the one or more cumulative values, thereby resulting in one or more probability values each indicating the probability of retirement of one of the one or more applications.

Referring now to FIG. 1, a block diagram illustrates an environment 100 in which a predictive retirement system 150 for assessing retirement of an application operates according to embodiments of the present invention. In some embodiments, a user 102 communicates via a client system 110, such as, for example, a computer system, server, mobile device, over a network 104 with the predictive retirement system 150. The predictive retirement system 150 communicates over the network 104 with one or more data sources, such as data sources 130A, 130B, and/or 130C.

The client system 110, in some embodiments, includes a processor or processing device 112 configured for accessing a file system 114, for example, a memory device. The file system is configured for storing one or more applications 116 for execution by the processor 112 or another processing device, and/or additional computer-readable program code 118 configured for being accessed by a processing device such as processor 112 and being executed thereby. Further, in various embodiments, the client system 110 includes a communication device 122 configured for communicating with one or more other system and/or data stores, such as the predictive retirement system 150 over the network 104. The client system also includes, in some embodiments, one or more input and/or output devices, such as, for example, keyboards, pointing devices, disk drives and the like (collectively referred to herein as I/O devices 124). Further, in some embodiments, the client system 110 also includes one or more displays 126 and/or speakers 128 and may include in some embodiments one or more other peripheral and/or included devices.

The predictive retirement system 150 has a processing device 152 configured for accessing a file system 154, such as a memory device. The processing device 152 is further configured for executing one or more applications stored in the file system 154 and/or other computer-readable program code 158. The processing device is further configured for controlling a communication device 160 configured for communicating, in some embodiments, over the network 104 with one or more data stores, such as data sources 130A, and in some embodiments, with one or more client systems 110.

The data source, for example data source 130A, in various embodiments, includes a processor 136, a communication device 138, and a file system such as a memory device 132. The file system includes data 134, such as attribute data corresponding to one or more applications as discussed further below. In some embodiments, one or more of the data sources, such as data source 130B does not include a processor, but rather is merely a database or repository configured for storing data for retrieval by one or more other systems, such as the predictive retirement system 150. In various embodiments, the network is or includes one or more local area networks (LANs), one or more intranets, one or more wide area networks (WANs) and/or the Internet.

Referring now to FIG. 2, a flowchart illustrating a method 200 for selecting one or more attributes indicative of application retirement is shown according to embodiments of the present invention. The first step, as represented by block 210 is receiving input from one or more key users regarding attributes potentially indicative of retirement of applications. The input, for example, is in response to one or more survey questions formulated based on a Six Sigma Voice of the Customer (VOC) process. The VOC process typically collates and ranks in importance the survey response based on the business requirements of the particular six sigma project. In one embodiment, for example, numerous survey questions are asked of the key users including the following:

1. What is the user's current area of work?
2. What tool or tools does the user's team use to detail application information such as name, support areas, location and the like?
3. What tool or tools does the user's team use to determine an application life cycle?
4. How does the user determine when to retire and application? For example, is there a set frequency within which the user or the user's team assesses applications?
5. What metrics or tools are the user and the user's team currently utilizing to determine retirement of applications supported? In other words, how does the user or user's team ensure that resources allocated are properly re-assigned?
6. Is there a process for making application retirement recommendations within the team? If so, does it have a name?
7. If a process does not exist for making application retirement recommendations, what three (3) key requirements would you want to be met by a new tool or process?
8. Would you consider customer transaction volumes when assessing the retirement potential of an application? Why or why not? Are there other considerations, such as risk rating?

9. What other criteria should be considered when evaluating an application for potential retirement? For example, risk rating, etc.
10. How and when are you communicating that you will retire an application?
11. How frequently do you achieve target dates when retiring an application?
12. If you are missing the target date of retirement, what are some of the root causes?
13. Are there any additional considerations for which the predictive retirement team should be aware?

In various other embodiments, of course, many different types of questions may be asked in order to receive input regarding current application retirement status and procedures. In some embodiments, the input is received at a client system 110 and then communicated to the predictive retirement system 150, where the communication device 158 and the processing device 152 of the predictive retirement system 150 receives the input.

Next, as represented by block 220, the received input is refined into a plurality of categories and requirement statements critical to quality. For example, in one embodiment, the predictive retirement system 150 uses analytical hierarchy processing (AHP) to refine the input. In some cases, follow up survey questions were presented to some or all of the key users in order to better clarify the input received. In some embodiments, both the receiving and the refining steps are performed manually. In one embodiment, the requirement statements critical to quality (CTQ) include the following:

1. Recommendations need to align with the business' initiatives and strategies;
2. Recommendations must not increase risk; and
3. Process solutions should leverages existing technology.

Next, as represented by block 230, potential solutions are prioritized based on the refined requirement statements. In some embodiments, this step is performed by a quality function diagram (QFD) with a multi-dimensional analysis, thereby determining a list of attributes indicative of retirement. In some embodiments, steps 220 and/or 230 are performed manually. In various other embodiments, the processing device 152 of the predictive retirement system 150 performs one or both steps 220 and/or 230. The QFD is also known as a House of Quality and works to align and prioritize the potential solutions with the customer requirement statements in several dimensions. In one instances, this process narrowed the potential list of attributes from about 200 to the five or six most likely to respond to the customer requirement statements. In this example, the six attributes included the following:

1. Life Expectancy, which is derived from a Lifecycle entry in a repository correlated against current age of an application, also entered in a repository;
2. Control Plan, which is typically a "YES" or "NO" based on risk
3. Performance, which is a measure of how well the application is performing based on risk
4. An additional Risk Rating;
5. Application Risk Band, which is a composite index measuring criticality of the application and is risk and strategy related; and
6. Declining/Not Permitted Technology, which is based on a declining or not permitted platform and is risk and strategy related.

Finally, as represented by block 240, the potential solutions, that is, attributes, such as those listed above, are further prioritized using regression testing. This, of course, reduces the potential list of attributes further. In one embodiment, after the regression testing, the three (3) attributes most indicative of probability of retirement of applications were Life Expectancy, Application Risk Band, and Declining/Not Permitted Technology.

In some embodiments, regression testing is performed on the list of attributes. Regression testing was chosen in such embodiments in order to gain understanding regarding how each of the application attributes were weighted in past application retirements in order to better predict future performance. In one embodiment, for example, a regression program called JMP 7.0.2 Statistical Discovery by SAS is used in the regression testing. In various other embodiments, regression testing is performed using one or more of SPSS Statistics by IBM, Minitab Statistical Software by Minitab, and, in some embodiments, a semi-manual regression technique using Microsoft Excel alongwith an Analysis Toolpak add-in is used.

In some embodiment, the regression model used includes "Ordinal response equations" based on the categorical type of data being analyzed. The equations generated for the probability table(s) discussed herein and the second predetermined values used in the probability table(s) are equations generated by the JMP regression tool or one of the other regression tools listed above. Typically, the Ordinal responses are modeled by fitting a series of parallel logistic curves to cumulative probabilities. Each attribute being considered is broken down into a plurality of categories based on the value of the attribute. The regression techniques determine scores associated with each attribute. Each score contains a numerical definition derived from the regression testing that determines the attribute value's contribution to the final result. The regression argument is continually refined until a few number of factors are achieved with the greatest influence on the final result. Thus, in the example discussed above, the six attributes were narrowed to three. In other words, running the attributes and their associated values through the regression equations determined which attributes were most likely to lead to a decision regarding retirement, and within those attributes, which values of each attribute were strongest indicators. The JMP technique, for example, constructs probability curves regarding each of the attribute values thereby indicating the greatest influence on the ultimate probability of retirement of the application. These values in the probability table(s) discussed herein, that is, the second predetermined values, are derived from the probability curves determined during regression testing. In one embodiment, for example, an Ordinal Logistic test is performed. The Ordinal Logistic test is a regression test using categorical information as inputs.

Referring now to FIG. 3, a flowchart illustrating a method 300 for setting up the predictive retirement toolset is shown according to embodiments of the present invention. First, as represented by block 310, a list of applications currently in use is generated. In some embodiments, the predictive retirement system 150 generates the list, and in other embodiments, the list is generated manually.

Next, as represented by block 320, a general extract is downloaded from the application extract repository, such as, for example, data source 130A. In some embodiments, the general extract is opened in a spreadsheet and one or more lookup tables are constructed. Some of the steps in constructing one or more lookup tables are as follows. In some embodiments, a plugin program, such as AppSource is downloaded and opened in the spreadsheet as well. In some embodiments, portions of the data from the downloaded general extract are exported into the plugin, such as AppSource. In various embodiments, the application inventory tracking (AIT) information, which corresponds with one or more applications, as well as information regarding one or more attributes, such as Life Expectancy data, is exported to the plugin as well. Next, the Life Expectancy and AIT information are converted to columns within the spreadsheet with corresponding, named ranges as a setup for performing a match function, such as a lookup function. In some embodiments, step 320 and one or more of the various sub-steps discussed above are performed by the predictive retirement system 150 and in others one or more are manually performed.

Next, as represented by block 330, one or more attributes are matched with one or more applications. For example, in one embodiment, the Life Expectancy attribute is matched to the appropriate AIT or its corresponding application. Step 330, in some embodiments, is also part of step 420 discussed below as well as steps 810 and 820 discussed below. Step 330, in some embodiments is performed by the predictive retirement system 150 and in other embodiments it is performed manually.

Referring now to FIG. 4, a flowchart illustrating a method 400 for assessing an application for retirement is shown according to embodiments of the present invention. In some embodiments, as preliminary steps, a predictive retirement toolset, which is a plugin application, is opened in a spreadsheet application and then initiated. This step can be performed manually or by the predictive retirement system 150 in various embodiments. Next, as represented by block 410, the processing device 152 receives attribute data corresponding to an application. In some embodiments, such as those discussed below with reference to FIG. 6, more than one application is assessed for retirement. The attribute data, in various embodiments, includes data related to the one or more attributes indicative of a probability of retirement. As discussed above with reference to FIGS. 2 and 3, in one embodiment, for example, the list of attributes was reduced to three (3) attributes tending to indicate retirement of applications. Thus, in that example, the attribute data received by the processing device 152 includes data regarding each of the three attributes for each application under assessment. In some embodiments, the processing device 152 receives more data than necessary for the assessment. For example, in some embodiments, even though only three attributes are being used in the assessment, the received attribute data includes data regarding other attributes associated with the applications under assessment. In some instances, the attribute data includes data regarding all of the attributes associated with the applications under assessment. In such cases, the processing device is configured for reducing the attribute data down to the data to be used in the assessment, such as, for example, by applying a filter to the data thereby eliminating the unnecessary data. In some embodiment, such reduction of the attribute data to the data actually being used in the assessment is a manual step.

Next, as represented by block 420, the processing device 152 translates at least some of the received attribute data into one or more translated values based at least in part on one or more predetermined values. This step 420, as discussed below with reference to FIG. 8, in some embodiments, includes use of one or more lookup tables and/or use of one or more probability tables. In some such embodiments, one or more of the tables are used in a spreadsheet. In other embodiments, the tables represent data organization recognized by the processing device 152 during execution of the steps of the various methods. Generally speaking, the relevant attribute data, that is, the attribute data related to the attributes being used for assessment, is populated within one or more tables.

For example, in one embodiment, a lookup table is constructed including a plurality of lookup fields. In some embodiments, the lookup fields include a range. The attribute data, which includes attribute values, that is, the values of the applications as they relate to the attributes, is compared with the various lookup fields. Each lookup field is associated with a predetermined value. The attribute value, once the lookup has been performed, and the attribute value is matched with a lookup field, is associated with one or more predetermined values. In some embodiments, the predetermined values are returned by the lookup table as output. In some embodiments, the processing device 152 recognizes the predetermined values corresponding with the lookup field that matches the attribute data. Thus, the processing device 152 is configured for using the appropriate predetermined value(s) in further processing. In some embodiments, the matched predetermined value(s) are the output of step 420, or in other words, the matched predetermined value(s) are the translated value(s) used in step 430.

As another example, in one embodiment, a probability table is constructed including a plurality of probability fields. In some embodiments, the probability fields include a range of values. The predetermined values chosen as discussed above with regard to the lookup table(s), termed the "first predetermined values," are compared with each of the probability fields in order to choose one or more second predetermined values. Each of the second predetermined values corresponds with one or more of the probability fields. In other words, the outputs from the lookup table(s) discussed above, that is, the chosen first predetermined values, are used as inputs in the probability table(s). The probability tables, similar to the lookup table(s) are used by the processing device to determine which of the second predetermined values correspond with the inputs. The second predetermined values are values calculated during a regression technique as discussed elsewhere herein. Once the second predetermined values are chosen based on the chosen first predetermined values and the probability table(s), they are output as the threshold values. Thus, in step 430, the chosen second predetermined values are combined.

In some embodiments, the lookup table(s) and the probability table(s) are the same table. That is, in some such embodiments, the input to the lookup table(s), that is the attribute data is compared to plurality of fields and matched with output value(s) representing both the lookup table and the probability table. In some other such embodiments, there are multiple lookup steps associated with one or more of the table(s) such that the first lookup occurs, then triggers the second lookup (the probability match), and then the output is generated. In some embodiments, mentioned above, there are no spreadsheet tables, but the tables are merely data structures housed at or proximate the processing device, such as within computer-readable program code and/or one or more applications being executed by the processing device.

Next, as represented by block 430, the processing device 152 combines the one or more translated values, thereby resulting in a combined value. For example, in one embodiment, the processing device 152 sums the one or more translated values resulting in the combined value. In other embodiments, the one or more translated values are combined in various other ways, such as be averaging or by taking a median in some embodiments. In other embodiments, certain of the translated values are eliminated before combining, such as by eliminating a certain number of outlier translated values. For example, in one embodiment where there are seven (7) translated values the lowest and the highest in value are eliminated from the subsequent conditioning.

Finally, as represented by block 440, the processing device 152 conditions the combined value, thereby producing a probability value indicating the probability of retirement of the application. The combined value, in this step is conditioned by, in some embodiments, computing a cumulative value using one or more derived equations as discussed in further detail below. Also in step 440, in some embodiments, the cumulative value is converted to a meaningful value, such as by reversing the sign of the cumulative value.

Referring now to FIG. 5, a flowchart illustrates step 440, previously presented in FIG. 4, in greater detail according to embodiments of the present invention. Step 440 includes conditioning the combined value, thereby producing a probability value indicating the probability of retirement of the application. First, as represented by block 510, the processing device 152 calculates a cumulative value based at least in part on the combined value. The cumulative value, in one embodiment, for example is calculated based on the following equation:

$$\text{Cumulative Value} = 1/(1+e^{\wedge}(\alpha - \text{Combined Value}))$$

wherein $\alpha=(-3.43395086180809)$ in some embodiments, and in other embodiments, $\alpha$ is determined to be a different value based on regression testing of the attributes being used in the assessment.

Next, as represented by block 520, the processing device 152 converts the cumulative value, thereby resulting in the probability value. The result of the above cumulative value calculation typically results in a negative probability values, and step 520 is performed in order to convert the negative probability value into a positive probability value. The probability value represents the likelihood or the probability of an application being ready for retirement.

Referring now to FIG. 6, a flowchart illustrates a method 600 for assessing a plurality of applications for retirement according to embodiments of the present invention. First, as represented by block 610, the processing device 152 receives attribute data corresponding to one or more of a plurality of applications. In some embodiments, the processing device 152 retrieves attribute data from more than one data source, such as a first repository as well as a second repository. In other embodiments, the processing device 152 retrieves all the attribute data from a single data source, such as data source 130A. In some embodiments, the attribute data is already stored locally, for example in one or more spreadsheets and/or in one or more data structures housed at or proximate the processing device, such as in the file system 154.

Next, as represented by block 620, the processing device 152 determines one or more of the plurality of applications to assess for retirement. In some embodiments, all of the applications are chosen to be assessed for retirement, but in other embodiments, less than all the applications are chosen to be assessed for retirement. In one embodiment, for example, only one application is chosen for assessment as discussed above. As discussed with reference to FIG. 7 below, the determination step 620 includes, in various embodiments, filtering of the large list of applications in order to shorten the list of applications to be assessed. In some embodiments, the filtering is based on a classification, such as which applications are being used in particular lines of business within an organization, and in other embodiments, the filtering is based on whether the application(s) are included in one or more statements of work, which include lists of applications based on various criteria for inclusion therein.

Finally, as represented by block 630, the processing device 152 conditions the one or more translated values thereby producing one or more probability values each indicating the probability of retirement of the one or more applications. As discussed above, in some embodiments, before conditioning, the translating step (420) as well as the combining step (430) are performed. The one or more translated values and/or the one or more combined values are used in the conditioning of step 630, in various embodiments. In some embodiments, step 630 includes calculating cumulative values based at least in part on combined values. In some embodiments, step 630 includes converting the cumulative values to positive values. The converted values, in some embodiments, are the one or more probability values representing probabilities of retirement of the applications.

Referring now to FIG. 7, a flowchart illustrates step 620, originally presented in FIG. 6, in greater detail according to embodiments of the present invention. Step 620, includes determining one or more of the plurality of applications to assess for retirement. First, as represented by block 710, the processing device, filters the attribute data based at least in part on which of one or more of a plurality of classifications each of the plurality of applications is classified. As mentioned above, the classifications, in some embodiments, correspond with the lines of business within an organization or enterprise. In other embodiments, various other types of classifications are used, such as, for example, classifications based on use of applications, type of application, and the like. In some embodiments, the classifications based on lines of business are referred to as a "financial hierarchy" classification scheme. Such embodiments typically involve financial institutions or the like.

Then, as represented by block 720, the processing device filters the attribute data based at least in part on which of a plurality of statements of work each of the plurality of applications is listed. The statements of work referred to herein include lists of applications that are typically unrelated to other classification schema. For example, the lists of applications in the statements of work are unrelated to classifications based on applications used within lines of business. Rather, the statement of work lists applications that, depending on the particular circumstances, include applications from across several lines of business that are otherwise unrelated, but for the author of the statement of work desiring to consolidate those particular applications into a list. In various embodiments, both steps 710 and 720 are performed, but in other embodiments only step 710 or step 720 are performed during filtering.

Referring now to FIG. 8, a flowchart illustrates a method 800 for constructing the tables used during step 420 originally presented in FIG. 4. First, as represented by block 810, the processing device 152 constructs a lookup table associated with one or more attributes. The lookup table includes one or more lookup fields each associated with one or more first predetermined values. As discussed above, the lookup table(s), in some embodiments, are table(s) within a spreadsheet utility and in other embodiments are data structures housed at the processing device or in the file system for use by the processing device during the various methods discussed herein.

Next, as represented by block 820, the processing device 152 compares the one or more lookup fields with each of the one or more attribute values to choose one or more first predetermined values. The attribute values, in some instances, are not numerical, but rather can be alphanumerical or otherwise. For example, in one instance an attribute for a particular application has a value of "Y" or, in another example, another attribute has a value of "significance." In such instances, making sense of the attribute values is necessary. The lookup table(s) does this by looking up the particular attribute values in the table(s) and determining a corresponding predetermined value, which is a numerical value to be used in subsequent data processing, for example, as in input into the probability table(s).

Next, as represented by block 830, the processing device 152, constructs a probability table associated with one or more attributes. The probability table includes one or more probability fields each associated with one or more second predetermined values. Similar to the lookup table(s) discussed above, the probability table(s), in some embodiments, are table(s) within a spreadsheet utility and in other embodiments are data structures housed at the processing device or in the file system for use by the processing device during the various methods discussed herein. The second predetermined values are based, in some embodiments, on the regression testing discussed above with reference to step 240 of FIG. 2.

Finally, as represented by block 840, the processing device 152, compares the chosen one or more first predetermined values with each of the one or more probability fields to choose one or more of the second predetermined values. The one or more translated values are based at least in part on the chosen one or more second predetermined values. Hence, referring back to FIG. 4, once the one or more second predetermined values are chosen, those values can be combined (step 430) and conditioned (step 440), thereby resulting in the probability value indicating the probability of retirement of the application.

Embodiments of the invention provide for method, systems and computer program products comprising instructions for assessing one or more applications for retirement. One embodiment of the system includes a processing device configured for receiving attribute data corresponding to one or more of a plurality of applications. The processing device is further configured for determining one or more of the plurality of applications to assess for retirement, translating at least some of the received attribute data into two or more translated values based at least in part on one or more predetermined values, and summing two or more of the translated values, thereby resulting in one or more combined values. The processing device is further configured for calculating one or more cumulative values based at least in part on the one or more combined values and converting the one or more cumulative values, thereby resulting in one or more probability values each indicating the probability of retirement of one of the one or more applications.

As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities.

As used herein, a "communication device" generally includes a modem, server, transceiver, and/or other device for communicating with other devices directly or via a network, and/or a user interface for communicating with one or more users. As used herein, a "user interface" generally includes a display, mouse, keyboard, button, touchpad, touch screen, microphone, speaker, LED, light, joystick, switch, buzzer, bell, and/or other user input/output device for communicating with one or more users.

As used herein, a "memory device" or "memory" generally refers to a device or combination of devices including one or more forms of non-transitory computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor/processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

What is claimed is:

1. A method for assessing an application for retirement, the method comprising:

receiving, at a processing device, input from one or more users, the input regarding attributes indicative of retirement of applications and in response to survey questions formulated based on Six Sigma Voice of the Customer (VOC) processing;

refining, by a processing device, the received input into a plurality of categories and requirement statements critical to application quality using analytical hierarchy processing;

prioritizing, by a processing device, the attributes using requirement statements critical to application quality within multiple dimensions using a quality function diagram, thereby determining a list of attributes indicative of application retirement;

further prioritizing, by a processing device, the attributes using regression testing, thereby shortening the list of attributes indicative of retirement;

generating, by a processing device, a list of applications comprising a plurality of applications, the generating comprising classifying each application into one or more of a plurality of classifications;

receiving, at a processing device, data comprising a set of attribute data comprising portions corresponding to each of the applications in the list of applications, the attribute data relating to one or more attributes in the shortened determined list of attributes indicative of application retirement and other data;

filtering, by a processing device, the set of attribute data to remove attribute data that does not relate to one or more attributes in the shortened determined list of attributes indicative of application retirement from the set of attribute data;

filtering, by a processing device, the data to remove the other data from the data;

determining, by a processing device, one or more of the applications in the list to assess for retirement, the determining comprising filtering, based on each application's determined classification, the list of applications, thereby removing one or more applications from the list of applications;

filtering, by a processing device and based on each application's classification, the set of attribute data, the filtering comprising removing the portions of the set of attribute data corresponding to the one or more applications removed from the list of applications, thereby resulting in a filtered set of attribute data;

translating, by a processing device, at least some of the filtered set of attribute data into two or more translated values based at least in part on one or more predetermined values;

eliminating, by a processing device, at least one of the two or more translated values, thereby resulting in a remaining set of translated values;

summing by a processing device, the remaining set of translated values, thereby resulting in a combined value; and conditioning, by a processing device, the combined value by:
calculating a cumulative value based at least in part on the combined value; and
converting the cumulative value, thereby producing a probability value indicating the probability of retirement of each application.

2. The method of claim 1, wherein each of the plurality of classifications corresponds with one or more lines of business within an organization.

3. The method of claim 1, wherein the filtering is based at least in part on which of a plurality of statements of work each of the plurality of applications is listed.

4. The method of claim 1, wherein the attribute data comprises data corresponding to one or more attributes, wherein the attribute data comprises one or more attribute values each associated with the application, and wherein the one or more predetermined values comprise one or more first predetermined values, the method further comprising:

constructing, by the processing device, a lookup table associated with one or more attributes, the lookup table comprising one or more lookup fields each associated with one or more of the first predetermined values; and
wherein:
translating at least some of the received attribute data comprises:
comparing the one or more lookup fields with each of the one or more attribute values to choose one or more of the first predetermined values, the one or more translated values based at least in part on the chosen one or more first predetermined values.

5. The method of claim 4, wherein the one or more predetermined values further comprise one or more second predetermined values, the method further comprising:
constructing, by the processing device, a probability table associated with one or more attributes, the probability table comprising one or more probability fields each associated with one or more of the second predetermined values; and wherein:
translating at least some of the received attribute data further comprises:
comparing the chosen one or more first predetermined values with each of the one or more probability fields to choose one or more of the second predetermined values, the one or more translated values based at least in part on the chosen one or more second predetermined values.

6. A system having a memory storing executable instructions for assessing an application for retirement, the system comprising:
a processing device configured for:
receiving input from one or more users, the input regarding attributes indicative of retirement of applications and in response to survey questions formulated based on Six Sigma Voice of the Customer (VOC) processing;
refining the received input into a plurality of categories and requirement statements critical to application quality using analytical hierarchy processing;
prioritizing the attributes using requirement statements critical to application quality within multiple dimensions, thereby determining a list of attributes indicative of application retirement using a quality function diagram;
further prioritizing the attributes using regression testing, thereby shortening the list of attributes indicative of retirement;
generating a list of applications comprising a plurality of applications, the generating comprising classifying each application into one or more of a plurality of classifications;
receiving data comprising a set of attribute data comprising portions corresponding to each of the applications in the list of applications, the attribute data relating to one or more attributes in the shortened determined list of attributes indicative of application retirement and other data;
filtering the set of attribute data to remove attribute data that does not relate to one or more attributes in the shortened determined list of attributes indicative of application retirement from the set of attribute data;
filtering the data to remove the other data from the data;
determining one or more of the applications in the list to assess for retirement, the determining comprising filtering, based on each application's determined classification, the list of applications, thereby removing one or more applications from the list of applications;
filtering, based on each application's classification, the set of attribute data, the filtering comprising removing the portions of the set of attribute data corresponding to the one or more applications removed from the list of applications, thereby resulting in a filtered set of attribute data;
translating at least some of the filtered set of attribute data into two or more translated values based at least in part on one or more predetermined values;
eliminating at least one of the two or more translated values, thereby resulting in a remaining set of translated values;
summing the remaining set of translated values, thereby resulting in a combined value; and
conditioning the one or more translated values combined value by:
calculating a cumulative value based at least in part on the combined value; and
converting the cumulative value, thereby producing a probability value indicating the probability of retirement of each application.

7. The system of claim 6, wherein each of the plurality of classifications corresponds with one or more lines of business within an organization.

8. The system of claim 6, wherein the filtering is based at least in part on which of a plurality of statements of work each of the plurality of applications is listed.

9. The system of claim 6, wherein the attribute data comprises data corresponding to one or more attributes, wherein the attribute data comprises one or more attribute values each associated with the application, and wherein the one or more predetermined values comprise one or more first predetermined values, the processing device further configured for:
constructing a lookup table associated with one or more attributes, the lookup table comprising one or more lookup fields each associated with one or more of the first predetermined values; and
comparing the one or more lookup fields with each of the one or more attribute values to choose one or more of the first predetermined values, the one or more translated values based at least in part on the chosen one or more first predetermined values.

10. The system of claim 9, wherein the one or more predetermined values further comprise one or more second predetermined values, the processing device further configured for:
constructing a probability table associated with one or more attributes, the probability table comprising one or more probability fields each associated with one or more of the second predetermined values; and
comparing the chosen one or more first predetermined values with each of the one or more probability fields to choose one or more of the second predetermined values, the one or more translated values based at least in part on the chosen one or more second predetermined values.

11. A computer program product comprising a non-transitory computer-readable memory comprising computer executable instructions for assessing an application for retirement, the instructions comprising:
instructions for receiving input from one or more users, the input regarding attributes indicative of retirement of applications and in response to survey questions formulated based on Six Sigma Voice of the Customer (VOC) processing;
instructions for refining the received input into a plurality of categories and requirement statements critical to application quality using analytical hierarchy processing;
instructions for prioritizing the attributes using requirement statements critical to application quality within multiple dimensions, thereby determining a list of attributes indicative of application retirement using a quality function diagram;
instructions for further prioritizing the attributes using regression testing, thereby shortening the list of attributes indicative of retirement;

instructions for generating a list of applications comprising a plurality of applications, the generating comprising classifying each application into one or more of a plurality of classifications;

instructions for receiving a set of attribute data comprising portions corresponding to each of the applications in the list of applications, the attribute data relating to one or more attributes in the shortened determined list of attributes indicative of application retirement and other data;

instructions for filtering the set of attribute data to remove attribute data that does not relate to one or more attributes in the shortened determined list of attributes indicative of application retirement from the set of attribute data;

instructions for filtering the data to remove the other data from the data;

instructions for determining one or more of the applications in the list to assess for retirement, the determining comprising filtering, based on each application's determined classification, the list of applications, thereby removing one or more applications from the list of applications;

instructions for filtering, based on each application's classification, the set of attribute data, the filtering comprising removing the portions of the set of attribute data corresponding to the one or more applications removed from the list of applications, thereby resulting in a filtered set of attribute data;

instructions for translating at least some of the filtered set of attribute data into two or more translated values based at least in part on one or more predetermined values;

instructions for eliminating at least one of the two or more translated values, thereby resulting in a remaining set of translated values;

instructions for summing the remaining set of translated values, thereby resulting in a combined value; and instructions for conditioning the combined value by:
calculating a cumulative value based at least in part on the combined value; and
converting the cumulative value, thereby producing a probability value indicating the probability of retirement of each application.

12. The computer program product of claim 11, wherein each of the plurality of classifications corresponds with one or more lines of business within an organization.

13. The computer program product of claim 11, wherein the instructions for filtering are based at least in part on which of a plurality of statements of work each of the plurality of applications is listed.

14. The computer program product of claim 11, wherein the attribute data comprises data corresponding to one or more attributes, wherein the attribute data comprises one or more attribute values each associated with the application, and wherein the one or more predetermined values comprise one or more first predetermined values, the instructions further comprising:

instructions for constructing a lookup table associated with one or more attributes, the lookup table comprising one or more lookup fields each associated with one or more of the first predetermined values; and wherein:
the instructions for translating at least some of the received attribute data comprise:
instructions for comparing the one or more lookup fields with each of the one or more attribute values to choose one or more of the first predetermined values, the one or more translated values based at least in part on the chosen one or more first predetermined values.

15. The computer program product of claim 14, wherein the one or more predetermined values further comprise one or more second predetermined values, the instructions further comprising:

instructions for constructing a probability table associated with one or more attributes, the probability table comprising one or more probability fields each associated with one or more of the second predetermined values; and wherein:
the instructions for translating at least some of the received attribute data further comprise:
instructions for comparing the chosen one or more first predetermined values with each of the one or more probability fields to choose one or more of the second predetermined values, the one or more translated values based at least in part on the chosen one or more second predetermined values.

* * * * *